J. J. PATTON.
TIRE.
APPLICATION FILED SEPT. 6, 1910.

1,016,709.

Patented Feb. 6, 1912.

Witnesses:
Lillia Miatt
G. W. Hopkins

Inventor:
John J. Patton
By his attorney
Geo. W. Miatt

UNITED STATES PATENT OFFICE.

JOHN J. PATTON, OF NEW YORK, N. Y.

TIRE.

1,016,709.    Specification of Letters Patent.    Patented Feb. 6, 1912.

Application filed September 6, 1910. Serial No. 580,641.

*To all whom it may concern:*

Be it known that I, JOHN J. PATTON, a citizen of the United States, residing in the borough of Brooklyn, city, county, and State of New York, have invented certain new and useful Improvements in Tires, of which the following is a specification.

My improvements while applicable to rubber tired wheels generally are designed more particularly to meet the conditions and requirements of heavy traction, as in the case of vehicles used for commercial purposes, stages, &c., where exceptional strength and durability are most desirable combined with simplicity of structure, and ease of substitution.

In Letters Patent No. 979,883 issued to me Dec. 27th, 1910, I show and describe a one piece annular metallic shrunk-on base plate or rim formed with continuous peripheral side flanges with relatively short tread sockets between them in conjunction with a cap plate formed to secure a plurality of treads in their seats.

My present invention consists in the specific construction and arrangement of parts hereinafter described and claimed, whereby the treads are effectually and positively secured in position.

Figure 1:
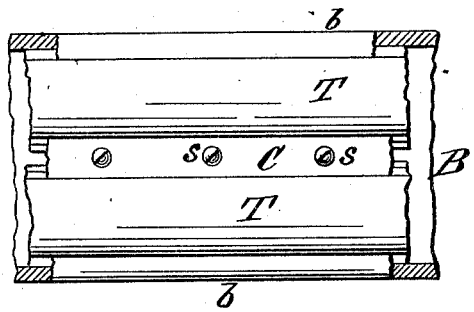
Figure 2:
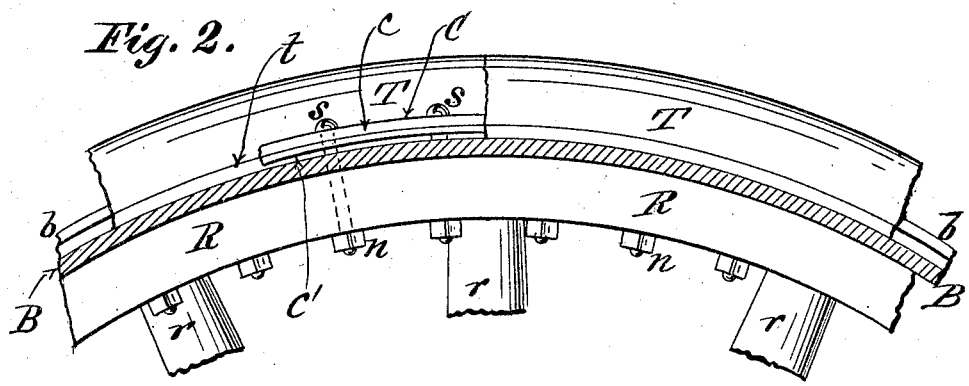
Figure 3:
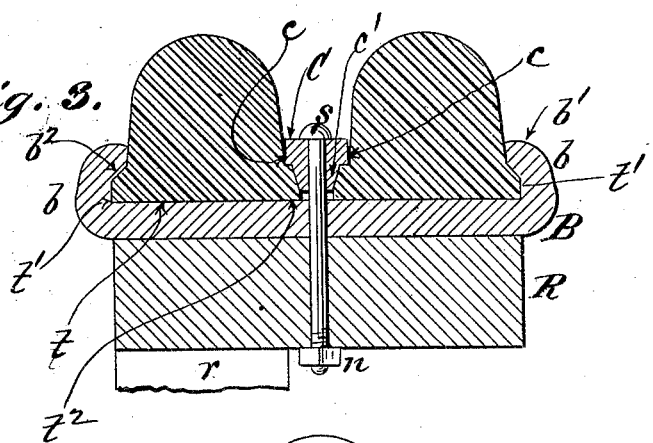
Figure 4:
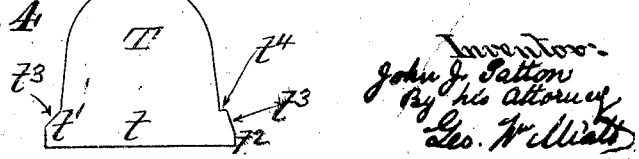

In the accompanying drawings: Figure 1, represents a face view of a portion of a two tread tire made in accordance with my invention, parts being broken away and in section to show the construction; Fig. 2, is a sectional elevation upon a larger scale of a portion of the rim and tire; Fig. 3, is a transverse section upon a still larger scale; Fig. 4, is a cross section of a tread in outline, to facilitate lettering.

The tire base plate B, consists of a continuous annular metallic rim formed in one piece with the out-turned circumferential side flanges $b$, which in the present case also have their peripheral edges inturned to form the retaining shoulders $b'$. Otherwise the cylindrical rim B is perfectly plain without intermediate ribs or partitions on its face. In other words the tread sockets shown in my said Letters Patent No. 979,883 are dispensed with, and continuous base rubber treads T, are used. In this connection it is to be understood that by the term rubber tread I mean to designate any elastic resilient tread adapted to the purpose, as is well known in the art.

The continuous base $t$, of the tread T is formed with side flanges $t'$, $t^2$, projecting laterally on each side of the tread body, and having inclined surfaces $t^3$. The under surfaces $b^2$, of the circumferential retaining shoulders $b'$, are correspondingly inclined, as are also the under sides of the wedge caps C, to contact with the said inclined surfaces $t^3$, on the treads. The tread side flanges $t^2$, which contact with the wedge caps C, are also formed with rectangular shoulders $t^4$, which engage with the side shoulders $c$, $c$, on the wedge cap C. For the lettering see mainly Figs. 3 and 4. Each wedge cap C is secured by screw bolts $s$, and nuts $n$,—the bolts passing through the wedge caps, the rim B, and the felly R of the wheel, upon which latter the said rim is shrunk. The wedge caps do not bear directly against the rim. That is to say they do not come in contact therewith,—the wedges $c'$, $c'$, being purposely made too short to reach the face of the rim even when fully driven home. Thus the tread is forced or wedged over against the circumferential retaining flange $b$, and firmly and positively locked in position. This arrangement and construction of parts also admits of the taking up of slack arising from wear and tear in use, since a margin of adjustment of bolts is afforded, as will be readily seen and understood by reference to Fig. 3.

By referring to Fig. 3, it will be seen that the positions of the bolts are at one side of the tire, and by making this the front or outer side of the wheel I obviously gain the advantage of having the bolts readily accessible from said front or outer face of the wheel. It is a well known custom, in the manufacture of heavy traction wheels especially, to offset the spokes to the inner or rear side of the rim so as to render the maximum of space between the spokes of opposite side wheels available for truck body, &c. Hence my arrangement of bolting through the wedge caps C, at the outer side of the tread renders the bolts conveniently accessible from the front or outer side of a wheel so that a damaged tread may be removed and another substituted without removing the wheel from its axle,—a new and important practical result. Thus repairs to my form of tire can be even made *en route* quickly and conveniently while the wheel is on its axle, and without detaching any part other than the wedge cap and the tread involved.

As in my Letters Patent hereinbefore referred to the circumferential side flanges $b$, of the rim B perform a double function in that they not only in the present case afford adequate means in conjunction with the wedge caps C whereby the treads are positively locked in position on the tire base plate, but they also act as side guards or fenders to protect the treads against contact with curbs or other extraneous objects.

The structure herein shown and described is obviously very simple, substantial and effective, and especially adapted to the exacting requirements of heavy traction. It also has the advantage that it enables me to arrange the retaining bolts nearer or further apart, or as may be found most expedient, without regard to the position of the spokes of the wheel, which is an important advantage in construction.

What I claim as my invention and desire to secure by Letters Patent is:

In a tire comprising a plurality of continuous-base treads, the combination with the base plate B, formed with the circumferential side flanges $b$, retaining shoulders $b'$, and inclined surfaces $b^2$, elastic resilient treads T, formed with base flanges $t'$, $t^2$, inclined surfaces $t^3$, and shoulders $t^4$, of a wedge cap C, formed with the shoulders $c$, $c$, and wedge $c'$, of less depth than the tread flanges $t^2$, and screw bolts securing the said wedge cap C, in position against the said tread flanges $t^2$, but out of contact with the base plate B, substantially in the manner and for the purpose set forth.

JOHN J. PATTON.

Witnesses:
GEO. WM. MIATT,
LILLIA MIATT.